United States Patent
Nagayasu

(10) Patent No.: US 9,381,775 B2
(45) Date of Patent: Jul. 5, 2016

(54) PNEUMATIC TIRE

(71) Applicant: The Yokohama Rubber Co., Ltd., Minato-ku, Tokyo (JP)

(72) Inventor: Masaaki Nagayasu, Hiratsuka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 666 days.

(21) Appl. No.: 13/736,426

(22) Filed: Jan. 8, 2013

(65) Prior Publication Data

US 2013/0180639 A1    Jul. 18, 2013

(30) Foreign Application Priority Data

Jan. 13, 2012  (JP) ................................. 2012-005241

(51) Int. Cl.
*B60C 11/12*    (2006.01)

(52) U.S. Cl.
CPC ............. *B60C 11/12* (2013.01); *B60C 11/1218* (2013.04); *B60C 11/1204* (2013.04); *B60C 11/1259* (2013.04); *B60C 11/1263* (2013.04); *B60C 2011/1209* (2013.04); *B60C 2011/1227* (2013.04); *B60C 2011/1231* (2013.04)

(58) Field of Classification Search
CPC ............. B60C 11/1218; B60C 11/1204; B60C 11/1236; B60C 11/1263; B60C 11/1281; B60C 2011/1227; B60C 2011/1231
USPC ........................................ 152/DIG. 3, 209.18
See application file for complete search history.

(56) References Cited

U.S. PATENT DOCUMENTS

| | | | | |
|---|---|---|---|---|
| 5,591,280 A | * | 1/1997 | Asano | ....................... 152/209.22 |
| 5,814,169 A | * | 9/1998 | Yamaguchi | ............. B60C 11/11 |
| | | | | 152/209.2 |
| 7,281,556 B2 | * | 10/2007 | Tsubono | ................... 152/209.21 |
| 2013/0133799 A1 | * | 5/2013 | Furusawa | ................. B60C 11/12 |
| | | | | 152/209.21 |

FOREIGN PATENT DOCUMENTS

| | | | | |
|---|---|---|---|---|
| JP | 2007022361 A | * | 2/2007 | |
| JP | 2010-274846 A | | 12/2010 | |
| WO | WO 9948707 A1 | * | 9/1999 | ............. B60C 11/12 |

OTHER PUBLICATIONS

Machine Translation: JP 2007022361 A; Yoshida, Hiroto; no date.*

* cited by examiner

*Primary Examiner* — Michael H Wilson
*Assistant Examiner* — Kendra Ly
(74) *Attorney, Agent, or Firm* — Global IP Counselors, LLP

(57) ABSTRACT

A pneumatic tire having improved performance on ice and wet road surfaces without degradation of steering stability on dry road surfaces. The pneumatic tire includes a tread portion, side wall portions, bead portions, a plurality of circumferential grooves extending in the tire circumferential direction and a plurality of lateral grooves extending in the tire width direction provided in the tread portion, a plurality of blocks partitioned by the circumferential and lateral grooves, and a plurality of sipes extending in the tire width direction in each block. At least some sipes include a main body part located centrally in the block width direction, and a deep-bottomed communicating portion that communicates with the circumferential groove adjacent to the block and has a depth not less than 50% the depth of the circumferential groove, and mutually mating convex and concave portions are formed locally in opposing surfaces in the deep-bottomed communicating portion.

12 Claims, 5 Drawing Sheets

Fig.5
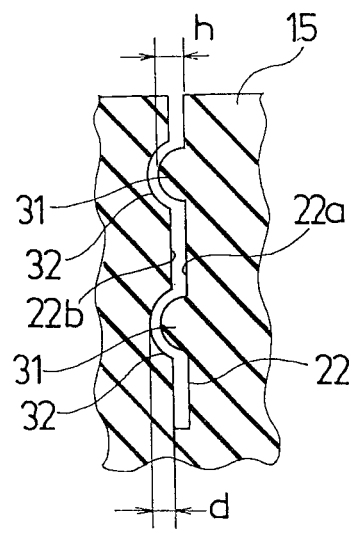
Fig.6(a)
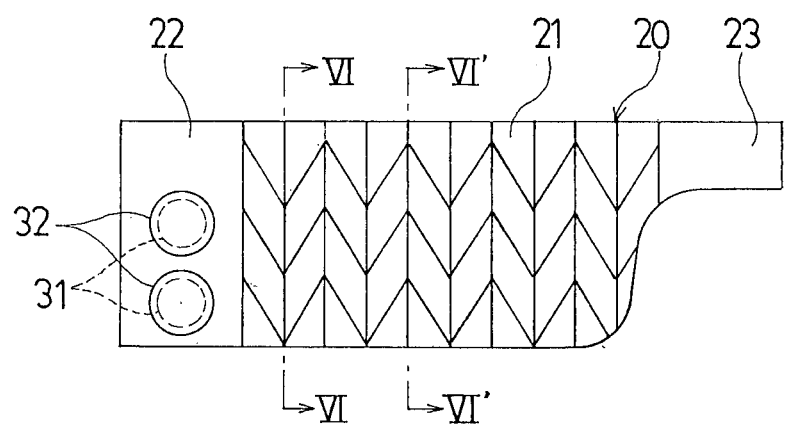
Fig.6(b)    Fig.6(c)
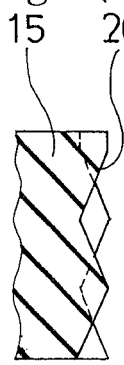  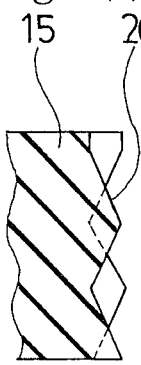
(b)           (c)

PNEUMATIC TIRE

CROSS-REFERENCE TO RELATED APPLICATIONS

This application claims priority under 35 U.S.C. §119(a) to Japanese Patent Application No. 2012-005241, filed in Japan on Jan. 13, 2012, the entire contents of Japanese Patent Application No. 2012-005241 are hereby incorporated herein by reference.

BACKGROUND

1. Field of the Invention

The present invention relates to a pneumatic tire provided with a plurality of sipes in the tread portion. More particularly, the present invention relates to a pneumatic tire having improved performance on icy and wet road surfaces without degradation of steering stability on dry road surfaces.

2. Background Information

In pneumatic tires for winter, such as studless tires, a plurality of circumferential grooves that extend in the circumferential direction and a plurality of lateral grooves that extend in the tire width direction are formed in the tread portion. A plurality of blocks is partitioned by these circumferential grooves and lateral grooves, and a plurality of sipes is formed in each block extending in the tire width direction. The method of improving the performance on ice by removing the water film on the surface of the ice by providing the plurality of sipes in the tread portion in this manner is known. Normally, if the density of the sipes is increased by increasing the number of sipes in order to further improve the performance on ice, the block rigidity is reduced, and the steering stability on dry road surfaces tends to reduce. Therefore, it has been proposed that raised bottom portions be provided in the ends of the sipes to minimize the reduction in block rigidity as described, for example, in Japanese Unexamined Patent Application Publication No. 2010-274846.

However, if raised bottom portions are provided in places such as the ends of the sipes, the communicating portion of the sipes with the circumferential grooves become smaller. Therefore, the effect of removal of the water film is reduced, and thus, the tire may not exhibit both good performance on icy road surfaces and good performance on wet road surfaces.

SUMMARY

Accordingly, it is an object of the present invention to provide a pneumatic tire having improved performance on icy and wet road surfaces without degradation of steering stability on dry road surfaces.

To achieve the above objective, the pneumatic tire according to a disclosed embodiment includes a tread portion extending in the tire circumferential direction to form an annular shape, a pair of side wall portions disposed on both sides of the tread portion, and a pair of bead portions disposed on the inner side in the tire radial direction of the side wall portions. The tread portion includes a plurality of circumferential grooves extending in the tire circumferential direction and a plurality of lateral grooves extending in the tire width direction, a plurality of blocks partitioned by the circumferential grooves and the lateral grooves, and a plurality of sipes extending in the tire width direction provided in each block. At least some of the sipes in the plurality of sipes formed in each block include a main body part located in the center in the tire width direction of the block, and a deep-bottomed communicating portion that communicates with the circumferential groove adjacent to the block and has a depth not less than 50% the depth of the circumferential groove. Thus, a mutually mating convex portion and concave portion is formed locally in the pair of opposing surfaces in the deep-bottomed communicating portion of the sipe.

Accordingly, there is good water flow between the sipe and the circumferential groove, and the water film removal effect is improved as a result of the deep-bottomed communicating portion communicating with the circumferential groove in at least some of the sipes in the plurality of sipes formed in each block. Therefore, it is possible for the tire to exhibit excellent performance on ice and excellent wet performance. On the other hand, in the deep-bottomed communicating portion of the sipe, mutually mating convex portions and concave portions are disposed locally on the pair of opposing surfaces. Therefore, it is possible to prevent reduction of rigidity of the blocks, and avoid degradation of the steering stability on dry road surfaces. As a result, it is possible to improve the performance on ice and the wet performance without degrading the steering stability on dry road surfaces.

Furthermore, the main body part of the sipe preferably is formed with a two-dimensional shape along the sipe length direction having an amplitude and having a three-dimensional structure in which the incline direction with respect to the tire radial direction varies in the sipe depth direction. Except in the area where the convex portion and the concave portion are formed, the deep-bottomed communicating portion of the sipe has a planar structure with a linear shape in the sipe length direction and a linear shape in the sipe depth direction. As a result, a high block rigidity is maintained based on the main body part of the sipe, and at the same time, it is possible to ensure good drainage properties in the deep-bottomed communicating portion of the sipe.

Also, preferably at least some of sipes in the plurality of sipes formed in each block include the main body part located in the center in the tire width direction of the block, and a shallow-bottomed communicating portion that communicates with the circumferential groove adjacent to the block and has a depth not more than 35% the depth of the circumferential groove. The deep-bottomed communicating portion and the shallow-bottomed communicating portion are mixed in the common wall face of the block that faces the circumferential groove. Preferably, the deep-bottomed communicating portion and the shallow-bottomed communicating portion are disposed in tire circumferential direction alternately in the common wall face of the block that faces the circumferential groove. This shallow-bottomed communicating portion contributes to increasing the block rigidity, so by combining the deep-bottomed communicating portion and the shallow-bottomed communicating portion, it is possible to improve the steering stability on dry road surfaces, the performance on ice, and the wet performance in a well-balanced manner.

In addition, the shallow-bottomed communicating portion of the sipe preferably has a planar structure with a linear shape along the sipe length direction and a linear shape along the sipe depth direction. In this way, it is possible to ensure sufficient drainage properties in the shallow-bottomed communicating portion of the sipe.

BRIEF DESCRIPTION OF THE DRAWINGS

FIG. 5 is a cross-sectional view illustrating a deep-bottomed communicating portion of the sipes formed in the block shown in FIG. 3;

FIGS. 6(a) through 6(c) illustrate the sipe formed in the block in FIG. 3, with FIG. 6(a) being a front view illustrating the inner surface of the sipes, FIG. 6(b) being a cross-sectional view at the arrows VI-VI in FIG. 6(a), and FIG. 6(c) being a cross-sectional view at the arrows VI'-VI' in FIG. 6(a);

DETAILED DESCRIPTION OF EMBODIMENTS

Embodiments of the present invention will now be explained with reference to the drawings. Description is given of materials of an inner liner which is a matter common to all of the embodiments.

Figure 1:
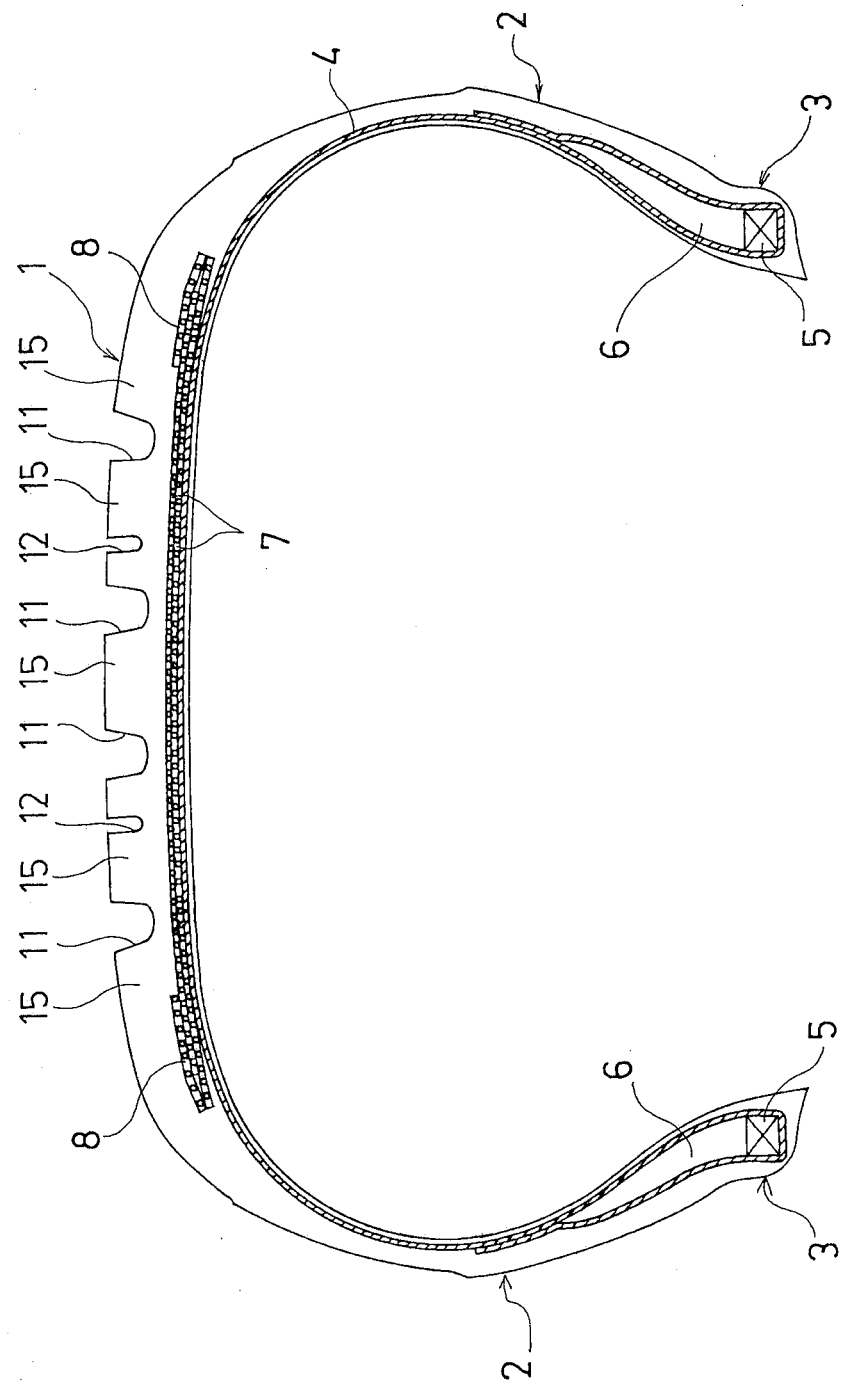
FIG. 1 is a meridian cross-sectional view illustrating a pneumatic tire according to a disclosed embodiment.
Figure 2:
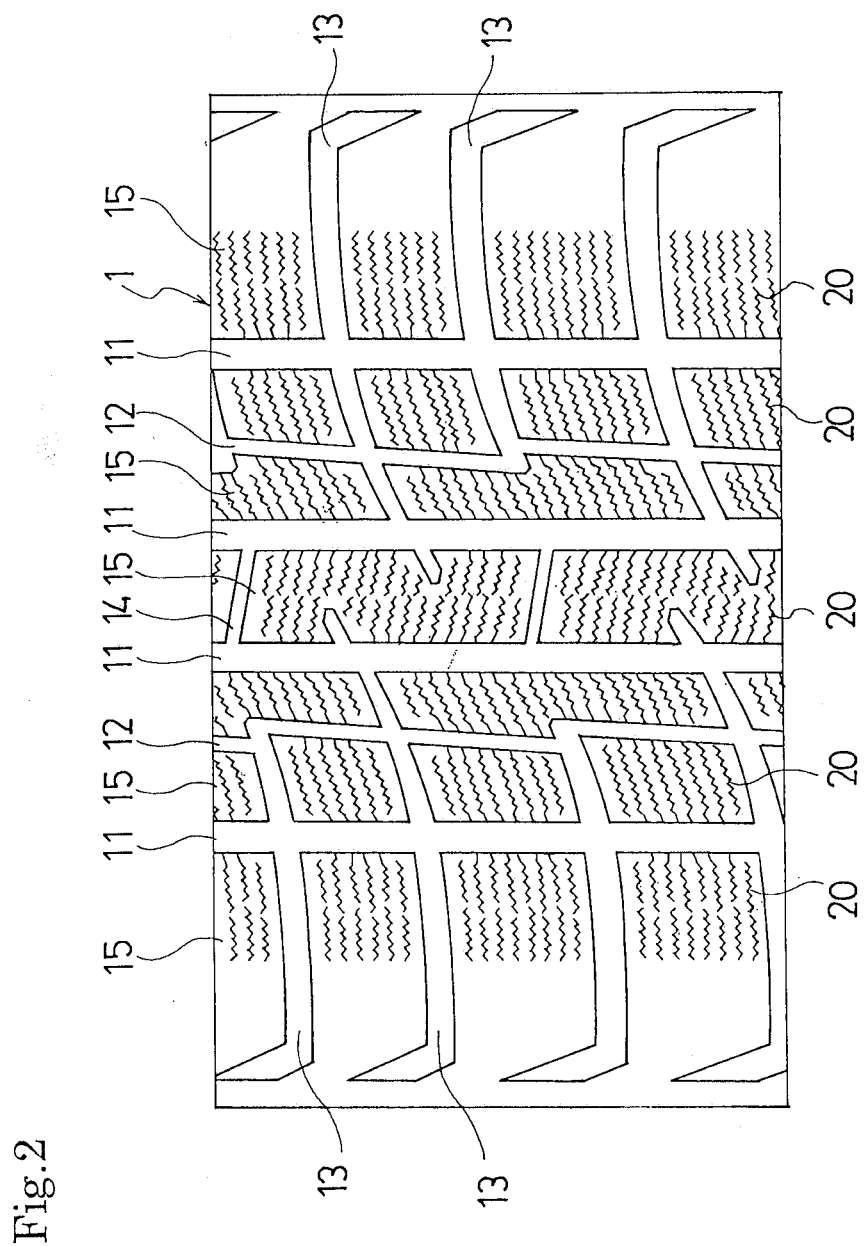
FIG. 2 is a development view showing a tread pattern of the pneumatic tire shown in FIG. 1.

FIGS. 1 and 2 illustrate a pneumatic tire according to a disclosed embodiment. As illustrated in FIG. 1, a pneumatic tire of this embodiment is provided with a tread portion 1 extending in the tire circumferential direction to form an annular shape, a pair of side wall portions 2 that is disposed on both sides of the tread portion 1, and a pair of bead portions 3 that is disposed on the inner side in the tire radial direction of the side wall portions 2. A carcass layer 4 is mounted between the pair of bead portions 3. The carcass layer 4 includes a plurality of reinforcing cords extending in the tire radial direction, and is folded back around a bead core 5 disposed in each of the bead portions 3 from the tire inner side to the tire outer side. Generally, organic fiber cords are used as the reinforcement cords of the carcass layer 4, but steel cords may be used. A bead filler 6 having a triangular cross-sectional shape formed from rubber composition is disposed on a periphery of the bead core 5.

A plurality of layers of a belt layer 7 is embedded on an outer circumferential side of the carcass layer 4 in the tread portion 1. These belt layers 7 include a plurality of reinforcing cords that incline with respect to the tire circumferential direction, and the reinforcing cords are disposed between the layers so as to intersect each other. In the belt layers 7, an inclination angle of the reinforcing cords with respect to the tire circumferential direction is set in a range from, for example, 10° to 40°. Steel cords are preferably used as the reinforcing cords of the belt layers 7. For the purpose of enhancing high-speed durability, at least one layer of a belt cover layer 8 formed by arranging reinforcing cords at an angle of not more than 5° with respect to the tire circumferential direction, is disposed on an outer circumferential side of the belt layers 7. A belt cover layer 8 preferably has a jointless structure in which a strip material made from a single reinforcing cord laid in parallel and covered with rubber is wound continuously in the tire circumferential direction. Also, the belt cover layer 8 can be disposed so as to cover the belt layer 7 in the width direction at all positions, or can be disposed to cover only the edge portions of the belt layer 7 to the outside in the width direction. Nylon, aramid, or similar organic fiber cords are preferably used as the reinforcing cords of the belt cover layer 8. It should also be noted that the tire internal structure described above is exemplary of a pneumatic tire, but the embodiments described herein are not limited to these features.

As illustrated in FIGS. 1 and 2, a plurality of circumferential grooves 11, 12 that extend in the tire circumferential direction and a plurality of lateral grooves 13, 14 that extend in the tire width direction are formed in the tread portion 1. A plurality of blocks 15 is partitioned in the tread portion 1 by the circumferential grooves 11, 12 and the lateral grooves 13, 14. A plurality of sipes 20 is formed in each of the blocks 15, extending in the tire width direction.

In this example, the circumferential grooves 11 are main grooves with relatively wide groove width, and the circumferential grooves 12 are auxiliary grooves whose groove width is narrower than that of the circumferential grooves 11. The groove width on the road contact surface of the circumferential grooves 11, 12 can be selected as desired, but to ensure drainage properties and steering stability, preferably they are set in the range from 2 to 20 mm, and more preferably in the range from 5 to 15 mm. If the groove width of the circumferential grooves 11, 12 are too narrow, the drainage properties will be insufficient; and conversely, if they are too wide, the steering stability will be insufficient. On the other hand, lateral grooves 13 that extend from a shoulder edge to the tire equator pass the circumferential groove 11 that is closest to the tire equator and terminate within a block 15 in the center of the tread portion 1, and lateral grooves 13 that terminate before the circumferential groove 11 that is closest to the tire equator are disposed alternately along the tire circumferential direction. Also, the lateral grooves 14 partition the blocks 15 located in the center of the tread portion 1.

Figure 3:
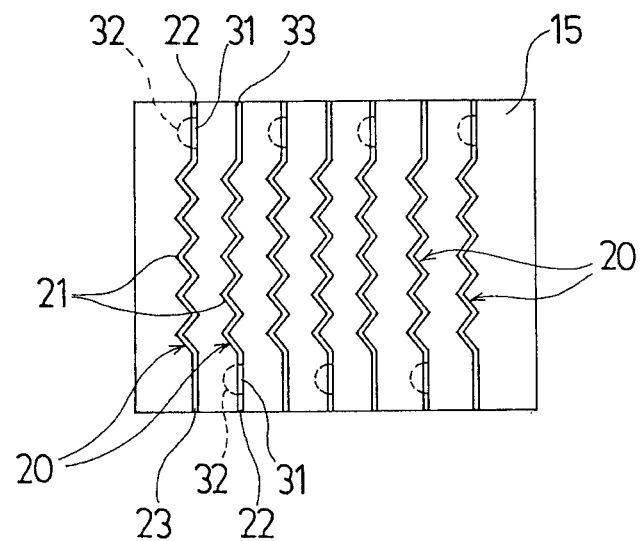
FIG. 3 is a plan view illustrating a typical block in the pneumatic tire shown in FIG. 1.
Figure 4:
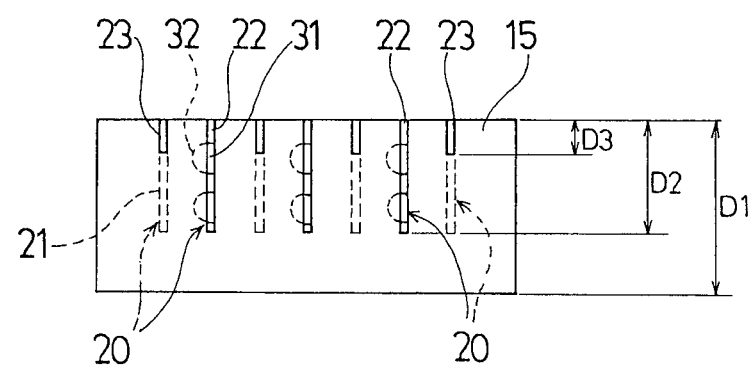
FIG. 4 is a side view of the block shown in FIG. 3.

FIGS. 3 and 4 illustrate representative blocks in the pneumatic tire according to a disclosed embodiment, and FIGS. 5 and 6 illustrate sipes formed in the blocks. As illustrated in FIGS. 3 and 4, each of the plurality of sipes 20 formed in the block 15 includes a main body part 21 located in the center in the width direction of the block 15, a deep-bottomed communicating portion 22 at a first side in the length direction of the main body portion 21 that communicates with the circumferential groove 11 and that has a depth D2 not less than 50% of the depth D1 of the circumferential groove 11, and a shallow-bottomed communicating portion 23 at a second side of the main body portion 21 in the length direction that communicates with the circumferential groove 11 and that has a depth D3 not more than 35% of the depth D1 of the circumferential groove 11. The deep-bottomed communicating portion 22 and the shallow-bottomed communicating portion 23 may also communicate with the circumferential groove 12.

Of the plurality of sipes 20 formed in the block 15, in pairs of sipes 20 that are adjacent to each other in the tire circumferential direction, the arrangement of position of deep-bottomed communicating portion 22 and the position of the shallow-bottomed communicating portion 23 is alternately reversed. Therefore, in the common side surface of the block 15 that faces any circumferential groove 11, the deep-bottomed communicating portions 22 and the shallow-bottomed communicating portions 23 of the sipes 20 are mixed. Specifically, in the common side surface of the block 15 that faces any circumferential groove 11, the deep-bottomed communicating portions 22 and the shallow-bottomed communicating portions 23 of the sipes 20 are not continuous in the tire circumferential direction but are arranged alternately.

As illustrated in FIG. 5, in the deep-bottomed communicating portion 22 of the sipe 20, mutually mating convex portions 31 and concave portions 32 are formed in pairs of opposing surfaces 22a, 22b. In other words, the convex portion 31 is formed protruding from the opposing surface 22a, and the concave portion 32 formed in the opposing surface 22b is shaped so that it can receive and form a pair with the convex portion 31. The convex portions 31 and the concave portions 32 are disposed only locally in the deep-bottomed communicating portion 22 of the sipe 20, and are not disposed in the main body part 21 or the shallow-bottomed communicating portion 23. Also, preferably a plurality of sets of convex portions 31 and concave portions 32 is disposed in each deep-bottomed communicating portion 22.

In the embodiment as described above, the convex portion 31 and the concave portion 32 are formed in a hemispherical shape, but there is no particular limitation on the shape of the convex portion 31 and the concave portion 32, and the shape of the two do not necessarily have to be the same. There is no particular limitation on the height h of the convex portion 31, but in order to ensure the effect of maximizing the block rigidity while maintaining processability during vulcanization, the height h may be set in the range from 0.5 to 3.0 mm, for example. On the other hand, the depth d of the concave portion 32 may be set in the range from 0.5 to 3.0 mm, the same as for the height h of the convex portion 31.

In the pneumatic tire as described above, there is good water flow between the sipe 20 and the circumferential groove 11 and the water film removal effect is improved, as a result of forming at least some of the sipes 20 in the plurality of sipes 20 formed in the block 15 from the main body part 21 located in the center in the tire width direction of the block 15 and the deep-bottomed communicating portion 22 that communicates with the circumferential groove 11 adjacent to the block 15 and that has a depth D2 that is not less than 50% of the depth D1 of the circumferential groove 11 and by communicating the sipes 20 to the circumferential groove 11 through the deep-bottomed communicating portion 22. Therefore, excellent performance on ice and excellent wet performance can be exhibited. Also, if the depth D2 of the deep-bottomed communicating portion 22 is less than 50% of the depth D1 of the circumferential groove 11, the effect of improving the performance on ice and the wet performance can be insufficient.

Furthermore, in the deep-bottomed communicating portion 22 of the sipe 20, mutually mating convex portions 31 and concave portions 32 are disposed locally on the pair of opposing surfaces 22a, 22b. Therefore, it is possible to prevent reduction of rigidity of the blocks 15, and avoid degradation of the steering stability on dry road surfaces. In other words, when the mutually mating convex portions 31 and concave portions 32 are provided on the opposing surfaces 22a, 22b of the deep-bottomed communicating portion 22, in particular, it is difficult for collapse of block fragments that have been partitioned by the sipes 20 of the block 15 to occur when braking or driving. Therefore on dry road surfaces, it is possible to exhibit excellent running performance. As a result, it is possible to improve the performance on ice and the wet performance without degrading the steering stability on dry road surfaces.

Also, at least some of the sipes 20 in the plurality of sipes 20 formed in the block 15 are formed from the main body part 21 located in the center in the tire width direction of the block 15 and the shallow-bottomed communicating portion 23 that communicates with the circumferential groove 11 adjacent to the block 15 and that has a depth D3 that is not more than 35% of the depth D1 of the circumferential groove 11. Therefore, the deep-bottomed communicating portion 22 and the shallow-bottomed communicating portion 23 are mixed in the common wall face of the block 15 that faces the circumferential groove 11. Hence, it is possible to increase the rigidity of the block 15 by the effect of raising the bottom of the shallow-bottomed communicating portion 23. In particular, when the deep-bottomed communicating portion 22 and the shallow-bottomed communicating portion 23 are disposed alternately in the tire circumferential direction on the common wall face of the block 15 that faces the circumferential groove 11, it is possible to achieve the effects of both increased rigidity of the block 15 and improved drainage properties. Therefore, it is possible to improve the steering stability on dry road surfaces, performance on ice, and wet performance in a well-balanced manner.

In the pneumatic tire as described above, as illustrated in FIG. 3 and FIGS. 6(a) through 6(c), the main body part 21 of the sipe 20 is formed with a two-dimensional shape along the sipe length direction (the tire width direction) having an amplitude, and has a three-dimensional structure with the incline direction with respect to the tire radial direction varying in the sipe depth direction. In other words, when viewed from the road contact surface side of the block 15, the main body part 21 has, for example, a zigzag shape or a wave-like shape, and when viewed from the side of the block 15, the main body part 21 has, for example, a zigzag shape or a wave-like shape. On the other hand, the deep-bottomed communicating portion 22 of the sipe 20 has a planar structure formed in a linear shape along the sipe length direction and a linear shape along the sipe depth direction, except in the area where the convex portion 31 and the concave portion 32 are formed. Likewise, the shallow-bottomed communicating portion 23 of the sipe 20 has a planar structure formed in a linear shape along the sipe length direction and a linear shape along the sipe depth direction. When this type of sipe 20 is provided in the block 15, a high block rigidity is maintained based on the main body part 21 having the three-dimensional structure, and at the same time, it is possible to ensure good drainage properties in the deep-bottomed communicating portion 22 and the shallow-bottomed communicating portion 23 which have a planar structure.

Also, in the embodiment as described above, it was explained that the sipe 20 passes across the block 15, and the sipe 20 includes the main body part 21, the deep-bottomed communicating portion 22, and the shallow-bottomed communicating portion 23. However, in a case where one end of the sipe 20 communicates with the circumferential groove 11 and the other end terminates within the block 15, the sipe 20 can be constituted from the main body part 21 and the deep-bottomed communicating portion 22.

Figure 7:
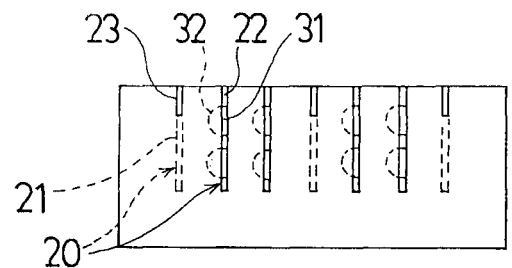
FIG. 7 is a side view illustrating a modified example of the block in the pneumatic tire shown in FIG. 1.
Figure 8:
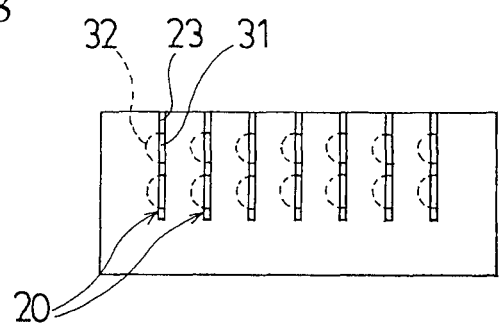
FIG. 8 is a side view illustrating another modified example of the block in the pneumatic tire shown in FIG. 1.

Furthermore, in the embodiment as described above, the case in which the deep-bottomed communicating portion 22 and the shallow-bottomed communicating portion 23 of the sipes 20 are disposed alternately in the tire circumferential direction in the common wall face of the block 15 that faces the circumferential groove 11 was explained as illustrated in FIG. 4. However, as illustrated in FIG. 7, the deep-bottomed communicating portion 22, and the shallow-bottomed communicating portion 23 can be disposed simply mixed in the common wall face of the block 15 that faces the circumferential groove 11. Alternatively, as illustrated in FIG. 8, the deep-bottomed communicating portion 22 only can be disposed in the common wall face of the block 15 that faces the circumferential groove 11. In each case, it is possible to improve the performance on ice and the wet performance compared with the conventional case in which all the communicating portions of the sipes 20 with the circumferential groove 11 have raised bottoms (see FIG. 9). Also, it is possible to maintain excellent steering stability on dry road surfaces compared with the case in which the communicating portion of the sipe 20 to the circumferential groove 11 does not have a raised bottom.

In addition, in the embodiment as described above, it was explained that the convex portions 31 and the concave portions 32 are arranged in each block 15 so that the convex portions 31 protrude in one direction, but the present invention is not limited to any particular direction of protrusion of the convex portions 31. For example, in the same block 15, convex portions 31 protruding to one side of the tire circumferential direction and convex portions 31 protruding to the other side of the tire circumferential direction may be mixed. Also, within the same deep-bottomed communicating portion 22, convex portions 31 protruding to one side of the tire circumferential direction and convex portions 31 protruding to the other side of the tire circumferential direction may be mixed. Alternatively, in the same block 15, the direction of protrusion of the convex portions 31 may be uniform, and the directions of protrusion of the convex portions 31 in the plurality of blocks 15 may be varied.

Although the above provides a detailed explanation of embodiments, it should be understood that various changes, substitutions, and replacements can be made to these embodiments provided that they do not deviate from the spirit and scope of the present invention as specified in the attached scope of claims.

EXAMPLES

Tires according to Working Examples 1 through 5 were manufactured with tire size of 195/65R15. A plurality of circumferential grooves extending in the tire circumferential direction and a plurality of lateral grooves extending in the tire width direction were provided in the tread portion. A plurality of blocks was partitioned by the circumferential grooves and the lateral grooves, and a plurality of sipes was provided in each block, extending in the tire width direction (FIG. 1). Each of the plurality of sipes formed in each block included a main body part and a deep-bottomed communicating portion and/or a shallow-bottomed communicating portion. In the deep-bottomed communicating portion of the sipe, mutually mating convex portions and concave portions were formed locally in the pair of opposing surfaces, and the groove width of the circumferential groove adjacent to the sipe and the sipe arrangement structure were set as shown in Table 1.

For comparison, a tire of a conventional example was prepared having the same structure as Working Example 1 except that each of the plurality of sipes formed in each block was formed from the main body portion and the shallow-bottomed communicating portion. Also, tires according to Comparative Examples 1 through 3 were prepared having the same structure as Working Examples 1 through 3 respectively, except that convex portions and concave portions were not provided in the pairs of opposing surfaces in the deep-bottomed communicating portions of the sipes.

The depth D1 of the circumferential groove adjacent to the sipe was 9 mm, the depth D2 of the deep-bottomed communicating portion of the sipe was 7 mm, and the depth D3 of the shallow-bottomed communicating portion of the sipe was 2 mm. The wet braking performance (wet performance), the braking performance on ice (performance on ice), and the steering stability on dry road surfaces were evaluated for these test tires by the following evaluation methods, and the results are also shown in Table 1.

Wet Braking Performance:

Each test tire was assembled on wheels with a rim size 15×6JJ and fitted to a test vehicle, and under conditions of air pressure 210 kPa and a wet road surface, the brake was applied from a traveling condition of 100 km/h and the braking distance until the test vehicle came to a complete stop was measured. The evaluation results were indexed using the inverse of the measurement values, Conventional Example being assigned an index value of 100. This index value means that the greater the value, the better the wet braking performance.

Braking Performance on Ice:

Each test tire was assembled on wheels with a rim size 15×6JJ and fitted to a test vehicle and under conditions of air pressure 210 kPa, the brake was applied from a traveling condition of 40 km/h on ice and the braking distance until the test vehicle came to a complete stop was measured. The evaluation results were indexed using the inverse of the measurement values, Conventional Example being assigned an index value of 100. A larger index value indicates superior braking performance on ice.

Steering Stability on Dry Road Surfaces:

Each test tire was assembled on wheels with a rim size 15×6JJ and fitted to a test vehicle with an air pressure of 210 kPa. Sensory evaluation for steering stability by a test driver was performed on a dry road surface. The evaluation results were indicated by index while the result of Conventional Example was indexed at 100. A larger index value indicates superior steering stability on dry road surfaces.

TABLE 1

Figure 9:
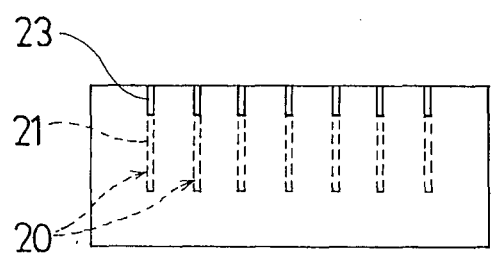
FIG. 9 is a side view illustrating a block in a conventional pneumatic tire.

|  | Conventional Example | Working Example 1 | Working Example 2 | Working Example 3 | Working Example 4 | Working Example 5 |
| --- | --- | --- | --- | --- | --- | --- |
| Groove width of circumferential groove (mm) | 10 | 10 | 10 | 10 | 5 | 15 |
| Sipe arrangement structure | FIG. 9 | FIG. 8 | FIG. 7 | FIG. 4 | FIG. 4 | FIG. 4 |
| Presence of convex portions and concave portions | No | Yes | Yes | Yes | Yes | Yes |
| Wet braking performance (index) | 100 | 110 | 110 | 110 | 105 | 105 |
| Braking performance on ice (index) | 100 | 105 | 107 | 110 | 105 | 105 |
| Steering stability on dry road surface (index) | 100 | 100 | 100 | 100 | 100 | 100 |

TABLE 1-continued

|  | Comparative Example 1 | Comparative Example 2 | Comparative Example 3 |
|---|---|---|---|
| Groove width of circumferential groove (mm) | 10 | 10 | 10 |
| Sipe arrangement structure | (FIG. 8) | (FIG. 7) | (FIG. 4) |
| Presence of convex portions and concave portions | No | No | No |
| Wet braking performance (index) | 110 | 110 | 110 |
| Braking performance on ice (index) | 105 | 107 | 110 |
| Steering stability on dry road surface (index) | 90 | 93 | 95 |

As can be seen from Table 1, the tires according to Working Examples 1 through 5 had improved wet braking performance and braking performance on ice without degradation in steering stability on dry road surfaces, compared with the Conventional Example. On the other hand, in the tires of Comparative Examples 1 through 3, although an effect of improving the wet braking performance and the braking performance on ice is seen because at least some of the sipes communicate with the circumferential groove via the deep-bottomed communicating portion, the convex portions and concave portions were not provided on opposing surfaces of the deep-bottomed communicating portion, so the steering stability on dry road surfaces degraded.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "outboard", inboard", "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention. The terms of degree such as "generally", "substantially", "about" and "approximately" as used herein mean a reasonable amount of deviation of the modified term such that the end result is not significantly changed. For example, two members that are angled less than ten degrees apart would be considered "generally perpendicular", but two members that are angled more than fifteen degrees apart would not be considered "generally perpendicular".

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pneumatic tire comprising:
a tread portion extending in a tire circumferential direction to form an annular shape;
a pair of side wall portions disposed on both sides of the tread portion;
a pair of bead portions disposed on an inner side in a tire radial direction of the side wall portion;
a plurality of circumferential grooves extending in the tire circumferential direction and a plurality of lateral grooves extending in a tire width direction provided in the tread portion;
a plurality of blocks partitioned by the circumferential grooves and the lateral grooves; and
a plurality of sipes extending in the tire width direction provided in each block, with each of at least some of sipes in the plurality of sipes formed in each block including a main body part located centrally in a width direction of the block, a deep-bottomed communicating portion at a first side in the length direction of the main body portion that communicates with the circumferential groove adjacent to the block and has a depth not less than 50% of a depth of the circumferential groove, and a shallow-bottomed communicating portion at a second side in the length direction of the main body portion that communicates with the circumferential groove adjacent to the block and has a depth not more than 35% of the depth of the circumferential groove,
a mutually mating convex portion and concave portion being formed locally in a pair of opposing surfaces in the deep-bottomed communicating portion of alternate ones of the at least some of sipes of the plurality of sipes formed in each block without being present in the shallow-bottomed communicating portion.

2. The pneumatic tire according to claim 1, wherein the main body part of the sipe is formed with a two-dimensional shape along a sipe length direction having an amplitude and has a three-dimensional structure in which an incline direction with respect to the tire radial direction varies in a sipe depth direction, and, except in the area where the convex portion and the concave portion are formed, the deep-bottomed communicating portion of the sipe has a planar structure with a linear shape in the sipe length direction and a linear shape in the sipe depth direction.

3. The pneumatic tire according to claim 2, wherein each of at least some of sipes in the plurality of sipes formed in each block includes the main body part located centrally in the width direction of the block, and a shallow-bottomed communicating portion that communicates with the circumferential groove adjacent to the block and has a depth not more than 35% the depth of the circumferential groove, and the deep-bottomed communicating portion and the shallow-bottomed communicating portion are mixed in a common wall face of the block that faces the circumferential groove.

4. The pneumatic tire according to claim 3, wherein the deep-bottomed communicating portion and the shallow-bottomed communicating portion are disposed alternately in the circumferential direction in the common wall face of the block that faces the circumferential groove.

5. The pneumatic tire according to claim 4, wherein the shallow-bottomed communicating portion has a planar structure with a linear shape along the sipe length direction and a linear shape along the sipe depth direction.

6. The pneumatic tire according to claim 3, wherein the shallow-bottomed communicating portion has a planar structure with a linear shape along the sipe length direction and a linear shape along the sipe depth direction.

7. The pneumatic tire according to claim 1, wherein the deep-bottomed communicating portion and the shallow-bottomed communicating portion are mixed in a common wall face of the block that faces the circumferential groove.

8. The pneumatic tire according to claim 7, wherein the deep-bottomed communicating portion and the shallow-bottomed communicating portion are disposed alternately in the circumferential direction in the common wall face of the block that faces the circumferential groove.

9. The pneumatic tire according to claim 8, wherein the shallow-bottomed communicating portion has a planar structure with a linear shape along the sipe length direction and a linear shape along the sipe depth direction.

10. The pneumatic tire according to claim 7, wherein the shallow-bottomed communicating portion has a planar structure with a linear shape along the sipe length direction and a linear shape along the sipe depth direction.

11. The pneumatic tire according to claim 1, wherein the mutually mating convex portion and concave portion are formed at a different depth than the additional mutually mating convex portion and concave portion in the pair of opposing surfaces.

12. A pneumatic tire comprising:
a tread portion extending in a tire circumferential direction to form an annular shape;
a pair of side wall portions disposed on both sides of the tread portion;
a pair of bead portions disposed on an inner side in a tire radial direction of the side wall portion;
a plurality of circumferential grooves extending in the tire circumferential direction and a plurality of lateral grooves extending in a tire width direction provided in the tread portion;
a plurality of blocks partitioned by the circumferential grooves and the lateral grooves; and
a plurality of sipes extending in the tire width direction provided in each block, with each of at least some of sipes in the plurality of sipes formed in each block including a main body part located centrally in a width direction of the block, a deep-bottomed communicating portion at a first side in the length direction of the main body portion that communicates with the circumferential groove adjacent to the block and has a depth not less than 50% of a depth of the circumferential groove, and a shallow-bottomed communicating portion at a second side in the length direction of the main body portion that communicates with the circumferential groove adjacent to the block and has a depth not more than 35% of the depth of the circumferential groove,
a mutually mating convex portion and concave portion being formed locally in a pair of opposing surfaces in the deep-bottomed communicating portion of the sipe without being present in the shallow-bottomed communicating portion,
at least one additional mutually mating convex portion and concave portion being formed locally in the pair of opposing surfaces in the deep-bottomed communicating portion of the sipe, and
the mutually mating convex portion and concave portion and the additional mutually mating convex portion and concave portion being formed locally in the pair of opposing surfaces in the deep-bottomed communicating portion of alternate ones of the at least some of sipes of the plurality of sipes formed in each block.

* * * * *